(12) United States Patent
Hermann et al.

(10) Patent No.: US 8,630,748 B2
(45) Date of Patent: Jan. 14, 2014

(54) METHOD AND APPARATUS FOR ACCESS AND/OR STARTING VERIFICATION

(75) Inventors: Stefan Hermann, Köfering (DE); Alexander Heinrich, Regensburg (DE); Franz Plattner, Arnschwang (DE)

(73) Assignee: Continental Automotive GmbH, Hannover (DE)

( * ) Notice: Subject to any disclaimer, the term of this patent is extended or adjusted under 35 U.S.C. 154(b) by 57 days.

(21) Appl. No.: 13/473,041

(22) Filed: May 16, 2012

(65) Prior Publication Data

US 2012/0316703 A1  Dec. 13, 2012

(30) Foreign Application Priority Data

May 16, 2011 (DE) .......................... 10 2011 075 886

(51) Int. Cl.
*G06F 7/00* (2006.01)
(52) U.S. Cl.
USPC ................. 701/2; 701/24; 375/141; 375/267; 375/347; 375/295; 375/308; 455/101; 455/103; 455/562.1; 370/320; 370/334; 370/342; 342/174; 342/359; 342/360; 714/752; 714/799
(58) Field of Classification Search
USPC ........ 701/2, 24; 375/347, 267, 141, 295, 308, 375/260, 219, 283, 296, 299, 143, 144; 455/101, 103, 562.1; 370/334, 342, 370/320; 342/359, 360, 174; 714/799, 752
See application file for complete search history.

(56) References Cited

U.S. PATENT DOCUMENTS

| | | | |
|---|---|---|---|
| 5,952,963 A * | 9/1999 | Shen et al. | 342/367 |
| 6,483,884 B1 * | 11/2002 | Shen et al. | 375/347 |
| 6,847,810 B2 * | 1/2005 | Shen et al. | 455/277.2 |
| 6,922,560 B1 * | 7/2005 | Zhang | 455/423 |
| 7,069,119 B2 * | 6/2006 | Ueda et al. | 701/2 |
| 2004/0073340 A1 * | 4/2004 | Ueda et al. | 701/2 |

FOREIGN PATENT DOCUMENTS

| | | | | |
|---|---|---|---|---|
| DE | 19610116 A1 | 9/1997 | | B60R 25/00 |
| DE | 19850792 A1 | 5/2000 | | B60R 25/00 |
| DE | 102005013910 B3 | 9/2006 | | B60R 25/00 |
| DE | 102011075886 B3 | 6/2012 | | B60R 25/00 |
| EP | 1403653 A1 | 3/2004 | | B60R 25/00 |
| GB | 2311155 A | 9/1997 | | B60R 25/00 |

OTHER PUBLICATIONS

German Office Action for Application No. 10 2011 075 886.0 (4 pages), Jan. 19, 2012.

* cited by examiner

*Primary Examiner* — James P. Trammell
*Assistant Examiner* — McDieunel Marc
(74) *Attorney, Agent, or Firm* — King & Spalding L.L.P.

(57) ABSTRACT

A method for access or starting verification for a vehicle using a mobile identification encoder and at least two antennas located in or on the vehicle at different locations includes: the antennas emitting electromagnetic signals at alterable times, wherein the electromagnetic signals are emitted in transmission blocks having alterable specific properties and wherein a plurality of transmission blocks are strung together to form a communication message in which each transmission block adopts an alterable position in time, the identification encoder receiving the electromagnetic signals emitted by the antennas and processing them to generate a response signal, and altering at least one of the times at which the individual antennas are actuated, the specific properties of the individual transmission blocks, and the position of the individual transmission blocks in time in the communication message in accordance with a cryptographical method.

13 Claims, 4 Drawing Sheets

METHOD AND APPARATUS FOR ACCESS AND/OR STARTING VERIFICATION

CROSS-REFERENCE TO RELATED APPLICATIONS

This application claims priority to DE Patent Application No. 10 2011 075 886.0 filed May 16, 2011. The contents of which is incorporated herein by reference in its entirety.

TECHNICAL FIELD

The disclosure relates to a method and an apparatus for access and/or starting verification, e.g., for a vehicle.

BACKGROUND

Originally, vehicles were able to be opened and started only by using mechanical locking systems. This required a key to be put into a locking cylinder or an ignition lock and turned. These systems were largely ousted by what are known as "remote access" systems, however. These electronic systems allow the vehicle to be opened or locked by operating a button, a remote control integrated in the key. To start the vehicle, these systems usually also require the key to be put into an ignition lock or a comparable apparatus.

For some time, automobile manufacturers have provided keyless access and starting systems, also known by the term "keyless entry and start systems", or "keyless systems" for short. These systems allow a vehicle to be opened and started without having to actively use a vehicle key. For this, an identification encoder (ID encoder) is integrated in the vehicle key. It suffices for the user merely to carry the key on him. As a result, a keyless system is very convenient, since unlocking and starting the vehicle no longer require the key to be sought and operated. So as also to be able to use the vehicle if the electronics fail, the keys also contain purely mechanical "emergency keys" nowadays.

In the meantime, various keyless systems have become known which all operate on the basis of a similar principle. The vehicle contains a plurality of antennas, and the key contains the ID encoder or a transponder. When the key is in proximity to the vehicle, the ID encoder or transponder receives a coded, electromagnetic signal from the antennas in the vehicle, decodes this signal and returns it with new coding. The signal received from the identification encoder is then compared with known code signals by means of evaluation electronics in the vehicle. In the event of a positive match between the signals, the vehicle is opened and started. When the ID encoder or transponder is outside a particular range, the vehicle is usually locked automatically.

Today, electronic engine immobilizers usually operate on the basis of a similar principle. For these, the key requires a simple read only transponder, which cyclically transmits a serial number in plain text, or a rewritable transponder, with which an identification number can be associated. The evaluation electronics in a vehicle are in turn coupled to the transponder by means of electromagnetic waves.

Since the transmission between vehicle and ID encoder is implemented by radio in all cases, the signals can be measured, disturbed or otherwise used by third parties. For example, by using two devices, one of which is situated in proximity to the vehicle and the other of which is situated in proximity to the ID encoder, it is possible to bridge a relatively long distance between the vehicle and the authorized ID encoder of the user by extending the radio link of the LF (low frequency) or HF (high frequency) communication channel used. In this way, it is possible to open and start a vehicle even though the ID encoder is not within the necessary range. In general terms, this is called a relay attack.

DE 10 2005 013 910 B3 describes a method for access and starting verification for a motor vehicle using a mobile identification transmitter with an evaluation unit. In this case the identification transmitter receives signals from antennas arranged in the vehicle, either simultaneously or at independent times from one another, measures the field strength thereof and in turn transmits them to an evaluation unit in the vehicle. This is intended to increase the security of such starting and access systems.

In the case of a relay attack on a keyless system or a transponder-based engine immobilizer, an attempt is usually made to analyze the field strength values transmitted by the vehicle antennas, the order and the combinations in which the antennas are actuated, and to simulate them to the authorized ID encoder. If it is possible to simulate the LF field on the ID encoder with a sufficient level of similarity to that in the vehicle when the communication channel between the vehicle and the authorized ID encoder is extended, the probability of the relay attack overcoming the keyless system or the engine immobilizer increases with every repetition.

SUMMARY

In one embodiment, a method for access and/or starting verification for a vehicle using a mobile identification encoder and at least two antennas situated in or on the vehicle at different locations, in which, the antennas emit electromagnetic signals at alterable times, wherein the electromagnetic signals are emitted in transmission blocks having alterable specific properties and a plurality of transmission blocks are strung together to form a communication message in which each transmission block adopts an alterable position in time, the identification encoder receives the electromagnetic signals emitted by the antennas and processes them to generate a response signal, and the times at which the individual antennas are actuated and/or the specific properties of the individual transmission blocks and/or the position of the individual transmission blocks in time in the communication message are altered in accordance with a cryptographical method.

In a further embodiment, a transmission block comprises a transmitted signal from an antenna in a prescribed time period or a plurality of signals, transmitted simultaneously by more than one antenna, in a prescribed time period. In a further embodiment, the specific properties of the transmission blocks include the field strength of individual signals, the summed field strength of a plurality of signals and/or the phase angle of a plurality of signals relative to one another. In a further embodiment, the signals are processed by means of an evaluation unit in the identification encoder, or response signals for these signals are processed by means of an evaluation unit in the vehicle. In a further embodiment, the processing of the signals in the identification encoder also includes the return of response signals to one or more of the or of other antennas. In a further embodiment, the electromagnetic signals are transmitted in the LF (low frequency) or HF (high frequency) range. In a further embodiment, the cryptographical method is an asymmetric method. In a further embodiment, the communication message is a message which is transmitted from the antennas to the identification encoder, or from the identification encoder to the antennas, said message being a signal train of individual or summed signals which is produced on the basis of the cryptographical method used.

In another embodiment, an apparatus for access and/or starting verification for a vehicle, having at least two antennas, situated in or on the vehicle at different locations, for transmitting electromagnetic signals, wherein the electromagnetic signals are emitted in transmission blocks having alterable specific properties and a plurality of transmission blocks are strung together to form a communication message in which each transmission block adopts an alterable position in time, and a mobile identification encoder for receiving and processing the electromagnetic signals emitted by the antennas, wherein the processing includes the generation of a response signal, wherein the times at which the individual antennas are actuated and/or the specific properties of the individual transmission blocks and/or the position of the individual transmission blocks in time in the communication message are altered in accordance with a cryptographical message.

BRIEF DESCRIPTION OF THE DRAWINGS

Example embodiments will be explained in more detail below with reference to figures, in which.

DETAILED DESCRIPTION

Some embodiments provide a method for access and/or starting verification for a vehicle using a mobile identification encoder and at least two antennas situated in or on the vehicle at different locations, in which the antennas emit electromagnetic signals at alterable times, wherein the electromagnetic signals are emitted in transmission blocks having alterable specific properties and a plurality of transmission blocks are strung together to form a communication message in which each transmission block adopts an alterable position in time, the identification encoder receives the electromagnetic signals emitted by the antennas and processes them to generate a response signal, and the times at which the individual antennas are actuated and/or the specific properties of the individual transmission blocks and/or the position of the individual transmission blocks in time in the communication message are altered in accordance with a cryptographical method.

Other embodiments provide an apparatus for access and/or starting verification for a vehicle, having at least two antennas, situated in or on the vehicle at different locations, for transmitting electromagnetic signals, wherein the electromagnetic signals are emitted in transmission blocks having alterable specific properties and a plurality of transmission blocks are strung together to form a communication message in which each transmission block adopts an alterable position in time, and a mobile identification encoder having an evaluation unit for receiving and processing the electromagnetic signals emitted by the antennas, wherein the processing includes the generation of a response signal, wherein the times at which the individual antennas are actuated and/or the specific properties of the individual transmission blocks and/or the position of the individual transmission blocks in time in the communication message are altered in accordance with a cryptographical method.

Figure 1:
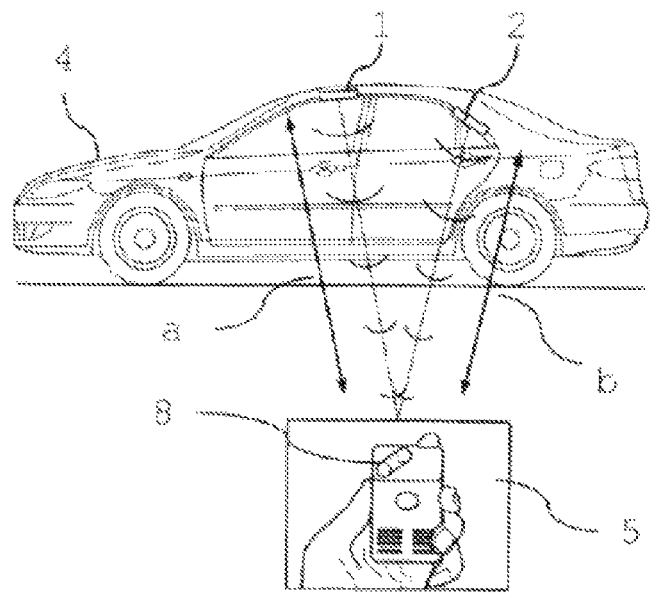
FIG. 1 shows an example keyless access and/or starting system having combined transmission and reception antennas.
Figure 2:
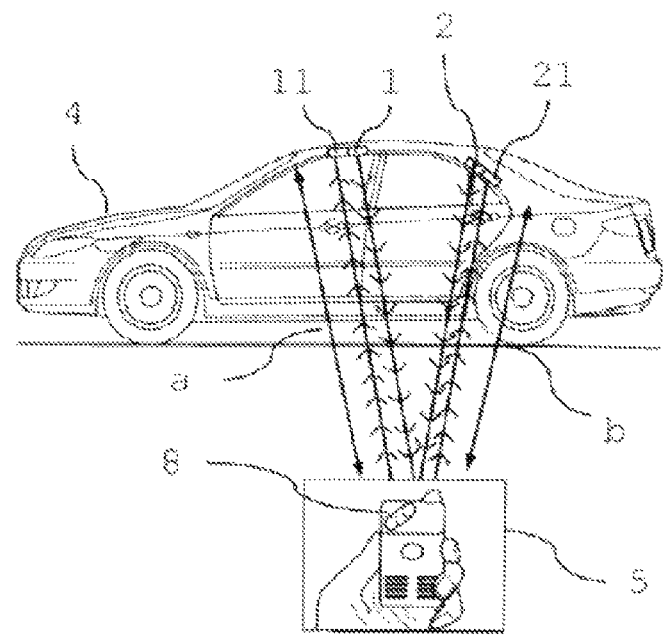
FIG. 2 shows another example keyless access and starting system having separate transmission and reception antennas.

FIGS. 1 and 2 shows schematic illustrations of an identification encoder 5 and a motor vehicle 4, according to two example embodiments. The vehicle 4 contains two antennas 1, 2, which emit signals, at different locations. By way of example, these are electromagnetic signals in the LF (low frequency) or HF (high frequency) range. In this case, the antennas 1, 2 can emit signals either individually or simultaneously. The signals are then received by the identification encoder 5 and then evaluated and/or processed further. For this, an appropriate evaluation unit 8 may be arranged in the identification encoder 5. Following the evaluation and/or further processing, corresponding response signals can be returned to the antennas 1, 2 and a downstream evaluation unit—not shown in the drawing. The response signals are transmitted in the UHF frequency band, for example.

In FIG. 1, the antennas 1, 2 are each in the form of transmission and reception antennas. However, it is also possible, as FIG. 2 shows, for the antennas 1, 2 to be in the form of transmission antennas only and for the response signals from the identification encoder 5 to be received again by further antennas 11, 21 in the vehicle and evaluated therein by means of an evaluation unit, for example.

In order to receive the signals transmitted by the antennas 1, 2, the identification encoder 5 needs to be situated within a particular radius of the vehicle, since signals in the LF and HF ranges have only a limited range. This radius may be 10 meters, for example. In theory, a response signal can be transmitted from the identification encoder 5 to the antennas 1, 2 or an evaluation unit in the vehicle over a greater range, since the signals used therein by way of example have a greater range in the UHF frequency band. The distance of the identification encoder 5 from the antenna 1 is denoted by a in FIG. 1, and the distance from the antenna 2 is denoted by b.

The antennas 1, 2 can emit signals continuously, but it is also possible by way of example, for signals to be emitted only upon a particular event. Such an event could be a door handle being touched or operated, for example. If the identification encoder 5 then transmits the correct response signal, the vehicle is unlocked. If the identification encoder transmits the correct response signal and can also be detected as being situated in the interior of the vehicle, the engine can be started by the user, for example by operating an engine start/stop button.

Figure 3:
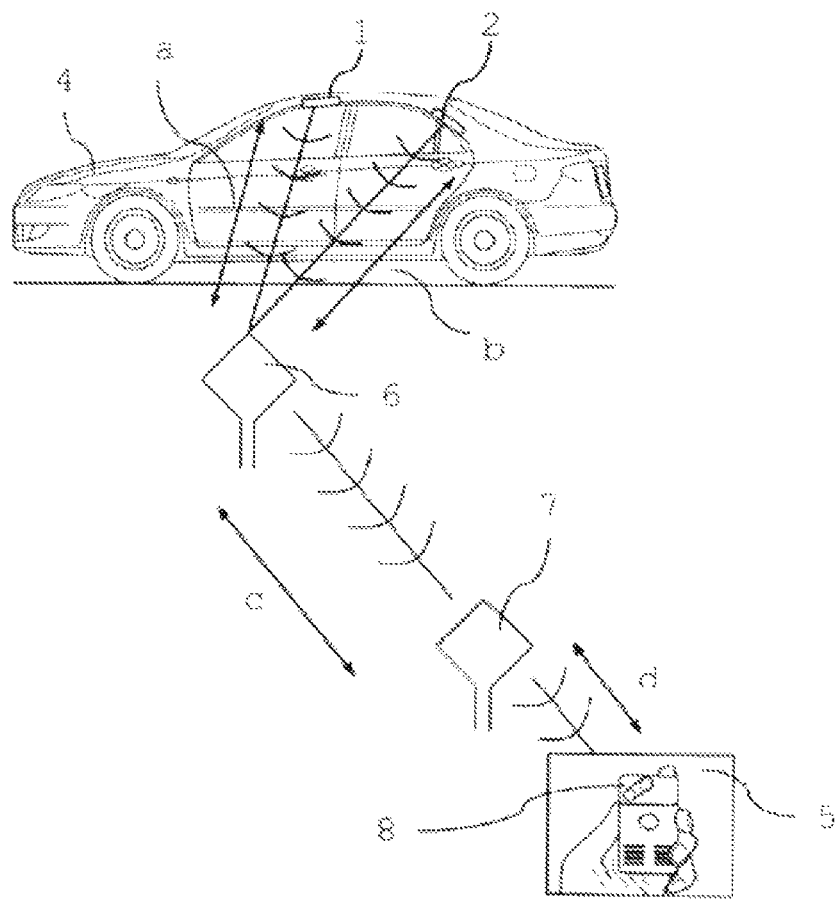
FIG. 3 shows an example of a relay attack on a keyless starting and access system.

FIG. 3 shows a schematic illustration of the same identification encoder 5 with an evaluation unit 8 and the vehicle 4, with the antennas 1, 2 arranged at two different locations in the vehicle 4, according to an example embodiment. In this view, the identification encoder 5 is outside the range of the signals transmitted by the antennas 1, 2. Within the radius for receiving the signals, there is a device 6 with an antenna in proximity to the vehicle 4. The distance from this device 6 to the antennas 1 and 2 is in turn denoted by a and b. Arranged within the range of the identification encoder 5 is a second device 7 with a further antenna. The distance from the device 7 to the device 6 is denoted by c, and the distance from the device 7 to the identification encoder 5 is denoted by d. The device 6 in proximity to the vehicle 4 receives the signals which are emitted by the antennas 1, 2 and forwards them to the device 7. The device 7 in turn transmits the signal to the identification encoder 5. In order to be able to transmit the signals over a distance c between the devices 6, 7, which is usually significantly greater than the normal range of the LF or HF signals, amplifiers and transmission stages, for example, are provided in the devices 6, 7.

This arrangement can therefore be used to bridge a distance of theoretically any length between the vehicle 4 and the identification encoder 5. In this case, the signals need to be modeled as exactly as possible on the signals originally transmitted by the antennas 1, 2 so that they are verified as correct by the evaluation units.

The identification encoder 5 in turn receives, evaluates and/or processes the signal. The response signal which is then emitted by the identification encoder 5 can be transmitted back to the vehicle via the same arrangement. If the signals are simulated with sufficient exactness over the entire transmission link, the evaluation electronics arranged in the vehicle therefore do not notice the identification encoder 5 is not within the range. Although the identification encoder 5 is not within the range, the vehicle can therefore be opened anyway. If the device 6 is inside the vehicle, the vehicle can likewise be started, for example by operating the engine start/stop button.

Figure 4:
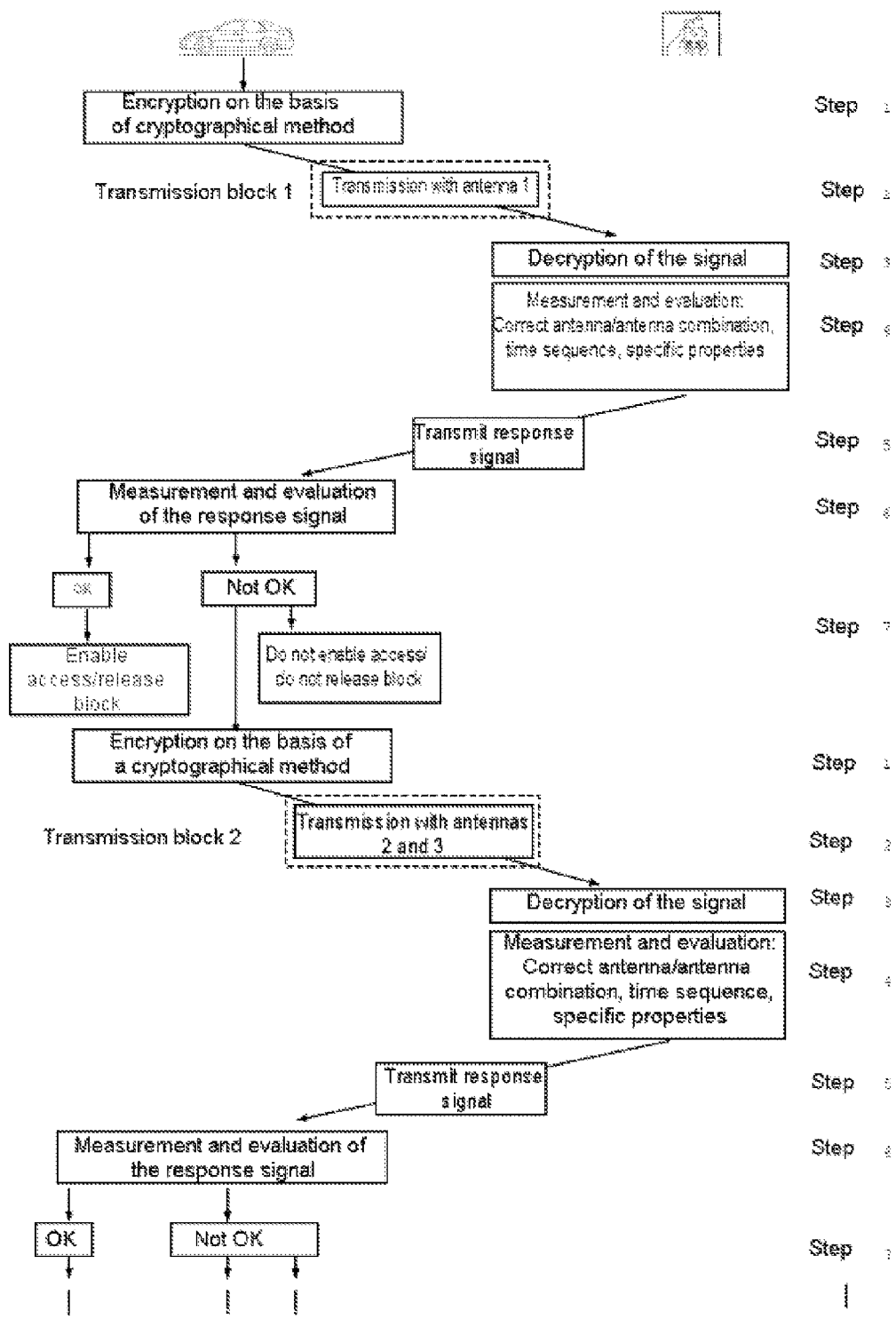
FIG. 4 shows an example sequence of a transmission and evaluation process.

FIG. 4 is used to show the basic sequence of signal transmission, measurement and evaluation by way of example. In this example, three antennas 1, 2 and 3, which are arranged in the vehicle 4 at different locations, are used for the signal transmission. In a first step, a previously determined, cryptographical method is used in a transmission and evaluation unit in the vehicle 4. This method can be used to vary the order of the transmitted signals, the combination of the antennas and the specific properties of the signals. That is to say that they are encrypted in a particular manner. The different parameters can be encrypted using any cryptographical methods (crypto methods) or algorithms. Modern crypto methods can be divided into two classes, symmetric and asymmetric methods. Both methods involve the use of a particular key for encryption and decryption. In the case of symmetric methods, all subscribers use the same key for encrypting and decrypting the data, and in the case of asymmetric methods, each subscriber uses a private, i.e. secret, and a public key, respectively. For the encryption of data, modern asymmetric methods are deemed to be particularly secure.

In the example shown, when the crypto method is being used, first of all only antenna 1 is used to transmit a signal with a particular field strength 1 to the identification encoder 5. The identification encoder 5 first of all decrypts the signal (step 3). The field strength of the signal 1 and any further specific properties are measured and evaluated in step 4. Since the transmission order and combination of the antenna signals are likewise varied on the basis of the crypto method, the key from which is known in the identification encoder 5, it is also possible to check the correctness of the transmission order and antenna combination. In a fifth step, the identification encoder 5 generates an appropriate response signal which is in turn measured and evaluated by the evaluation unit in the vehicle 4 in step 6.

If the response signal is verified as being correct, access to the vehicle 4 is enabled, and the engine immobilizer is released. The vehicle 4 can be opened and/or started. If the evaluation unit in the vehicle 4 does not receive a correct response signal, however, the vehicle 4 remains locked and the sequence is repeated again from step 1. In the example shown, the antenna order and combination are again varied on the basis of the crypto method, and a respective signal is then simultaneously transmitted using the antennas 2 and 3. This results in a summed signal 23 with a particular summed field strength. This signal is in turn decrypted by the evaluation unit 8 in the identification encoder 5 in step 3 and is then measured and evaluated in step 4. A response signal is again transmitted, which is again measured and evaluated in the evaluation unit in the vehicle 4. This sequence can be repeated until the evaluation unit gives an "OK" to open or start the vehicle or the system enters a standby mode, for example, where the identification encoder 5 or device 6 moves outside the range.

Figure 5:
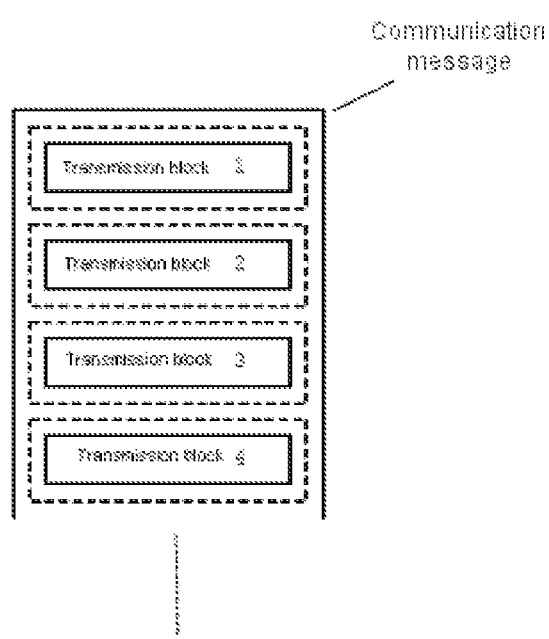
FIG. 5 shows an example structure of a communication message.

The signals transmitted on the basis of this principle during a defined period result in a transmission block. As FIG. 4 shows, a first transmission block accordingly comprises signal 1, and a second transmission block comprises the signals from the antennas 2 and 3. Each transmission block has specific properties which result from the specific properties of the individual signals. A plurality of transmission blocks which succeed one another in time form a communication message. The basic structure of such a communication message comprising transmission blocks which succeed one another in time is shown in FIG. 5.

The cryptographical method used can be used to vary the specific properties of the signals or transmission blocks. In this case, the specific properties may be, by way of example, the field strength of a signal from an antenna or of a summed signal from a plurality of antennas, but also the phase angle of two signals transmitted simultaneously from different antennas relative to one another, for example. Thus, by way of example, signals from two antennas 2, 3 with the same phase angle (signal 23) or else with a phase angle shifted through 180° (signal 23 (180°), for example, can be transmitted. In this case, the phase angle of the signals relative to one another can theoretically assume any possible value. Even when signals are simultaneously transmitted using more than two antennas, any variation of the phase angles of the signals is possible.

However, it is not just possible to vary the specific properties using the crypto method used. By way of example, it is also possible to vary the combination of signals within a transmission block. When three different antennas are used, all combinations 1, 2, 3, 12, 13, 23, 123 are possible. If the position of the individual signals in time is additionally taken into account in the case of simultaneous transmission in a transmission block using more than one antenna, all further combinations 21, 31, 32, 132, etc. are also possible. Furthermore, it is also possible to alter the position of the individual transmission blocks in time in the communication message on the basis of the crypto method.

The encryption of one more parameters prevents the devices 6, 7, which are used for extending the communication channels, or the amplifiers and transmission stages which are present in said devices, for example, from being able to be adjusted for the field transmitted by the vehicle in the event of repeated attempts.

LIST OF REFERENCE SYMBOLS

1 Antenna
2 Antenna
3 Antenna
4 Vehicle
5 Identification encoder
6 Device
7 Device
8 Evaluation unit
11 Antenna
21 Antenna

What is claimed is:
1. A method for access or starting verification for a vehicle using a mobile identification encoder and at least two antennas located in or on the vehicle at different locations, comprising:

the antennas emitting electromagnetic signals at alterable times, wherein the electromagnetic signals are emitted in transmission blocks having alterable specific properties and wherein a plurality of transmission blocks are strung together to form a communication message in which each transmission block adopts an alterable position in time, the identification encoder receiving the electromagnetic signals emitted by the antennas and processing them to generate a response signal, and altering at least one of the times at which the individual antennas are actuated, the specific properties of the individual transmission blocks, and the position of the individual transmission blocks in time in the communication message in accordance with a cryptographical method.

2. The method of claim 1, wherein a transmission block comprises a transmitted signal from an antenna in a prescribed time period or a plurality of signals, transmitted simultaneously by more than one antenna, in a prescribed time period.

3. The method of claim 2, wherein the specific properties of the transmission blocks include at least one of a field strength of individual signals, a summed field strength of a plurality of signals, and a phase angle of a plurality of signals relative to one another.

4. The method of claim 1, wherein the signals are processed by means of an evaluation unit in the identification encoder, and response signals for these signals are processed by means of an evaluation unit in the vehicle.

5. The method of claim 4, wherein the identification encoder is configured to transmit the response signal to one or more of the at least two antenna or of one or more other antennas.

6. The method of claim 1, wherein the electromagnetic signals are transmitted in the LF (low frequency) or HF (high frequency) range.

7. The method of claim 1, wherein the cryptographical method is an asymmetric method.

8. The method of claim 1, wherein the communication message is transmitted from the antennas to the identification encoder, or from the identification encoder to the antennas, said message being a signal train of individual or summed signals which is produced on the basis of the cryptographical method used.

9. An apparatus for access and/or starting verification for a vehicle, comprising:

at least two antennas located in or on the vehicle at different locations and configured to emit electromagnetic signals in transmission blocks having alterable specific properties, wherein a plurality of transmission blocks are strung together to form a communication message in which each transmission block adopts an alterable position in time, a mobile identification encoder configured to receive and process the electromagnetic signals emitted by the antennas, wherein the processing includes the generation of a response signal, and transmission and evaluation unit configured to alter at least one of the times at which the individual antennas are actuated, the specific properties of the individual transmission blocks, and the position of the individual transmission blocks in time in the communication message in accordance with a cryptographical method.

10. The apparatus of claim 9, wherein a transmission block comprises a transmitted signal from an antenna in a prescribed time period or a plurality of signals, transmitted simultaneously by more than one antenna, in a prescribed time period.

11. The apparatus of claim 10, wherein the specific properties of the transmission blocks include at least one of a field strength of individual signals, a summed field strength of a plurality of signals, and a phase angle of a plurality of signals relative to one another.

12. The apparatus of claim 9, wherein the electromagnetic signals are transmitted in the LF (low frequency) or HF (high frequency) range.

13. The apparatus of claim 9, wherein the cryptographical method is an asymmetric method.

* * * * *